(12) United States Patent
Kim et al.

(10) Patent No.: US 9,614,392 B2
(45) Date of Patent: Apr. 4, 2017

(54) WIRELESS POWER TRANSMISSION APPARATUS AND METHOD

(71) Applicant: Samsung Electronics Co., Ltd., Suwon-si (KR)

(72) Inventors: Nam Yun Kim, Seoul (KR); Hyuk Choon Kwon, Seoul (KR); Sang Wook Kwon, Seongnam-si (KR); Ki Young Kim, Yongin-si (KR); Dong Zo Kim, Yongin-si (KR); Soo Yeon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 14/280,025

(22) Filed: May 16, 2014

(65) Prior Publication Data

US 2014/0340033 A1    Nov. 20, 2014

(30) Foreign Application Priority Data

May 16, 2013 (KR) .................. 10-2013-0055874

(51) Int. Cl.
*H02J 7/00* (2006.01)
*H01F 27/42* (2006.01)
(Continued)

(52) U.S. Cl.
CPC ............ *H02J 7/025* (2013.01); *H02J 7/0021* (2013.01); *H02J 7/0029* (2013.01); *H02J 50/40* (2016.02); *H02J 2007/0096* (2013.01)

(58) Field of Classification Search
CPC .......................................................... H02J 7/025
(Continued)

(56) References Cited

U.S. PATENT DOCUMENTS 7,605,496 B2 * 10/2009 Stevens .................. H02J 5/005
                                                                    307/17
9,331,517 B2 *  5/2016 Tanabe .................... H02J 7/025
(Continued)

OTHER PUBLICATIONS

International Search Report issued in Aug. 18, 2014, in counterpart International Application No. PCT/KR2014/004391 (3 pages, in English).

(Continued)

*Primary Examiner* — Edward Tso
*Assistant Examiner* — Ahmed Omar
(74) *Attorney, Agent, or Firm* — NSIP Law

(57) ABSTRACT

A wireless power transmission apparatus for tracking a charging capacity of each of a plurality of wireless power reception apparatuses in an environment in which the plurality of wireless power reception apparatuses are charged includes a communication unit configured to receive information about either one or both of a charging support power and a requested power from each of the plurality of wireless power reception apparatuses, a controller configured to determine a charging capacity for a wireless power reception apparatus supporting the charging support power among the plurality of wireless power reception apparatuses based on the information about the charging support power, and a power tracker configured to re-track the determined charging capacity based on charging status information received from the plurality of wireless power reception apparatuses.

25 Claims, 15 Drawing Sheets

(51) Int. Cl.
*H02J 7/02* (2016.01)
*H02J 50/40* (2016.01)

(58) Field of Classification Search
USPC .......................................................... 320/108
See application file for complete search history.

(56) References Cited

U.S. PATENT DOCUMENTS

| | | |
|---|---|---|
| 9,369,002 B2* | 6/2016 | Uchida ................... H02J 5/005 |
| 2010/0248622 A1 | 9/2010 | Lyell Kirby et al. |
| 2011/0149788 A1 | 6/2011 | Chuang et al. |
| 2011/0154087 A1 | 6/2011 | Craine |
| 2011/0279244 A1 | 11/2011 | Park et al. |
| 2012/0169137 A1 | 7/2012 | Lisi et al. |
| 2012/0293118 A1 | 11/2012 | Kim et al. |
| 2013/0088192 A1 | 4/2013 | Eaton |
| 2013/0099733 A1 | 4/2013 | Park et al. |
| 2013/0099734 A1 | 4/2013 | Lee et al. |

OTHER PUBLICATIONS

Extended European Search Report issued Jan. 23, 2017, in counterpart European Application No. 14797695.5 (6 pages, in English).

* cited by examiner

WIRELESS POWER TRANSMISSION APPARATUS AND METHOD

CROSS-REFERENCE TO RELATED APPLICATIONS

This application claims the benefit under 35 USC 119(a) of Korean Patent Application No. 10-2013-0055874 filed on May 16, 2013, in the Korean Intellectual Property Office, the entire disclosure of which is incorporated herein by reference for all purposes.

BACKGROUND

1. Field

The following description relates to an apparatus and a method for transmitting power wirelessly in an environment in which a plurality of wireless power reception apparatuses are charged.

2. Description of Related Art

Research on wireless power transmission has been started to overcome an increase in the inconvenience of wired power supplies and the limited capacity of conventional batteries due to a rapid increase in various electronic devices including electric vehicles, mobile devices, and other devices intended to operate without a wired power supply. One wireless power transmission technology uses resonance characteristics of radio frequency (RF) devices. A wireless power transmission system using resonance characteristics may include a source configured to supply power, and a target configured to receive the supplied power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus for tracking a charging capacity of each of a plurality of wireless power reception apparatuses in an environment in which the plurality of wireless power reception apparatuses are charged includes a communication unit configured to receive information about either one or both of a charging support power and a requested power from each of the plurality of wireless power reception apparatuses; a controller configured to determine a charging capacity for a wireless power reception apparatus supporting the charging support power among the plurality of wireless power reception apparatuses based on the information about the charging support power received from the wireless power reception apparatus supporting the charging support power; and a power tracker configured to re-track the determined charging capacity based on charging status information received from the plurality of wireless power reception apparatuses.

The communication unit may be further configured to receive the information about the requested power from each of the plurality of wireless power reception apparatuses; and the controller may include a determiner configured to determine whether the plurality of wireless power reception apparatuses are capable of being charged within a range of a power capacity of the wireless power transmission apparatus based on the information about the requested power received from each of the plurality of wireless power reception apparatuses.

The controller may be further configured to determine the charging capacity for the wireless power reception apparatus supporting the charging support power based on the information about the charging support power received from the wireless power reception apparatus supporting the charging support power in response to a total amount of power requested by the plurality of wireless power reception apparatuses exceeding the range of the power capacity of the wireless power transmission apparatus.

The controller may include a calculator configured to calculate the charging capacity for the wireless power reception apparatus supporting the charging support power based on a charging support mode provided by the wireless power reception apparatus supporting the charging support power.

The communication unit may be further configured to receive constant voltage (CV) mode switching information indicating that a charging mode of one of the wireless power reception apparatuses has been switched to a CV mode; and the power tracker may be further configured to readjust a charging capacity for another one of the wireless power reception apparatuses to be a requested power of the other wireless power reception apparatus in response to the communication unit receiving the CV mode switching information from the one wireless power reception apparatus.

At least one of the plurality of wireless power reception apparatuses may be configured to support the requested power and not support the charging support power.

The communication unit may be further configured to receive the charging status information from the wireless power reception apparatus supporting the charging support power to be charged with the determined charging capacity.

The communication unit may be further configured to transmit information about the determined charging capacity to the wireless power reception apparatus supporting the charging support power.

In another general aspect, a wireless power transmission apparatus for determining whether each of a plurality of wireless power reception apparatuses is to be charged and tracking a charging capacity in an environment in which the plurality of wireless power reception apparatuses are charged includes a communication unit configured to receive information about either one or both of a charging support power and a requested power from each of the plurality of wireless power reception apparatuses; a controller configured to determine whether charging capacities of the plurality of wireless power reception apparatuses are within a range of a power capacity of the wireless power transmission apparatus based on the information about the either one or both of the charging support power and the requested power; and a display unit configured to display a capacity exceeded message in response to the controller determining that the charging capacities exceed the range of the power capacity.

The wireless power transmission apparatus may further include a verifier configured to verify whether the plurality of wireless power transmission apparatuses include a wireless power reception apparatus located out of a charging area of the wireless power transmission apparatus after the capacity exceeded message has been displayed.

The communication unit may be further configured to re-receive information about the either one or both of the charging support power and the requested power after the capacity exceeded message has been displayed; and the controller may be further configured to determine a charging capacity for a wireless power reception apparatus supporting the charging support power among the plurality of wireless power reception apparatuses based on the re-received information about the either one or both of the charging support power and the requested power.

The wireless power transmission apparatus may further include a power tracker configured to re-track the determined charging capacity based on charging status information received from the plurality of wireless power reception apparatuses.

The communication unit may be further configured to receive the information about the requested power from each of the plurality of wireless power reception apparatuses; and the controller may be further configured to determine a combination of wireless power reception apparatuses to be charged to be a combination of wireless power transmission apparatuses minimizing a residual amount of the power capacity of the wireless power transmission apparatus based on the power capacity of the wireless power transmission apparatus and the information about the requested power received from the plurality of wireless power reception apparatuses.

The controller may be further configured to determine a combination of wireless power reception apparatuses to be charged to be a combination of a maximum number of wireless power reception apparatuses capable of being charged within the range of the power capacity of the wireless power transmission apparatus.

The wireless power transmission apparatus may further include a recognizer configured to recognize an external power supply; and the controller may be further configured to determine a charging capacity for a wireless power reception apparatus supporting the charging support power among the plurality of wireless power reception apparatuses based on a power capacity of the external power supply and the information about the either one or both of the charging support power and the requested power received from the plurality of wireless power reception apparatuses.

In another general aspect, a wireless power transmission method of a wireless power transmission apparatus for tracking a charging capacity of each of a plurality of wireless power reception apparatuses in an environment in which the plurality of wireless power reception apparatuses are charged includes receiving information about either one or both of a charging support power and a requested power from each of the plurality of wireless power reception apparatuses; determining a charging capacity for a wireless power reception apparatus supporting the charging support power among the plurality of wireless power reception apparatuses based on the information about the charging support power received from the wireless power reception apparatus supporting the charging support power; and re-tracking the determined charging capacity based on charging status information received from the plurality of wireless power reception apparatuses.

The receiving may include receiving the information about the requested power from each of the plurality of wireless power reception apparatuses; and the determining may include determining whether the plurality of wireless power reception apparatuses are capable of being charged within a range of a power capacity of the wireless power transmission apparatus based on the information about the requested power received from each of the plurality of wireless power reception apparatuses.

The determining may include determining the charging capacity for the wireless power reception apparatus supporting the charging support power based on the information about the charging support power received from the wireless power reception apparatus supporting the charging support power in response to a total amount of power requested by the plurality of wireless power reception apparatuses exceeding the range of the power capacity of the wireless power transmission apparatus.

The determining may include calculating the charging capacity for the wireless power reception apparatus supporting the charging support power based on a charging support mode provided by the wireless power reception apparatus supporting the charging support power.

The method may further include receiving the charging status information from the wireless power reception apparatus supporting the charging support power to be charged with the determined charging capacity.

In another general aspect, a wireless power transmission apparatus for tracking a charging capacity of each of a plurality of wireless power reception apparatuses in an environment in which the plurality of wireless power reception apparatuses are charged includes a communication unit configured to receive information about a charging support power and a requested power from each of ones of the plurality of wireless power reception apparatuses supporting the charging support power, information about a requested power from each of other ones of the plurality of wireless power reception apparatuses not supporting the charging support power, and charging status information from each of the plurality of wireless power reception apparatuses; a controller configured to allocate respective charging capacities to the plurality of wireless power reception apparatuses so that a sum of the allocated charging capacities does not exceed a range of a power capacity of the wireless power transmission apparatus based on the information about the charging support power and the requested power; and a power tracker configured to reallocate the respective charging capacities based on the charging status information.

The controller may be further configured to determine whether a sum of the requested powers of the plurality of wireless power reception apparatuses exceeds the range of the power capacity of the wireless power transmission apparatus; allocate the respective charging capacities based on the information about the requested power received from each of the plurality of wireless power reception apparatuses in response to a result of the determining being that the sum of the requested powers of the plurality of wireless power reception apparatuses does not exceed the range of the power capacity of the wireless power transmission apparatus; and allocate the respective charging capacities based on the information about the charging support power received from each of the ones of the plurality of wireless power reception apparatuses supporting the charging support power and the requested power received from each of the other ones of the plurality of wireless power reception apparatuses not supporting the charging support power in response to a result of the determining being that the sum of the requested powers of the plurality of wireless power reception apparatuses exceeds the range of the power capacity of the wireless power transmission apparatus.

The communication unit may be further configured to receive constant voltage (CV) mode switching information indicating that a charging mode has been switched to a CV mode from ones of the plurality of wireless power reception apparatuses in which a charging mode has been switched to the CV mode; and the power tracker may be further configured to reallocate the respective charging capacities based on the charging status information and the CV mode switching information.

The controller may be further configured to determine whether the wireless power transmission apparatus is capable of charging all of the wireless power reception apparatuses simultaneously based on the information about the charging support power and the requested power; generate a removal request message requesting that one of the wireless power reception apparatuses be removed from a charging area of the wireless power transmission apparatus in response to a result of the determining being that the wireless power transmission apparatus is not capable of charging all of the wireless power reception apparatuses simultaneously; and allocate respective charging capacities to remaining ones of the plurality of wireless power reception apparatuses after one of the wireless power reception apparatuses has been removed from the charging area of the wireless power transmission apparatus.

The controller may be further configured to determine whether the wireless power transmission apparatus is capable of charging all of the wireless power reception apparatuses simultaneously based on the information about the charging support power and the requested power; and allocate respective charging capacities to only ones of the plurality of wireless power reception apparatuses that the wireless power transmission apparatus is capable of charging simultaneously in response to a result of the determining being that the wireless power transmission apparatus is not capable of charging all of the wireless power reception apparatuses simultaneously.

Other features and aspects will be apparent from the following detailed description, the drawings, and the claims.

DETAILED DESCRIPTION

Figure 1:
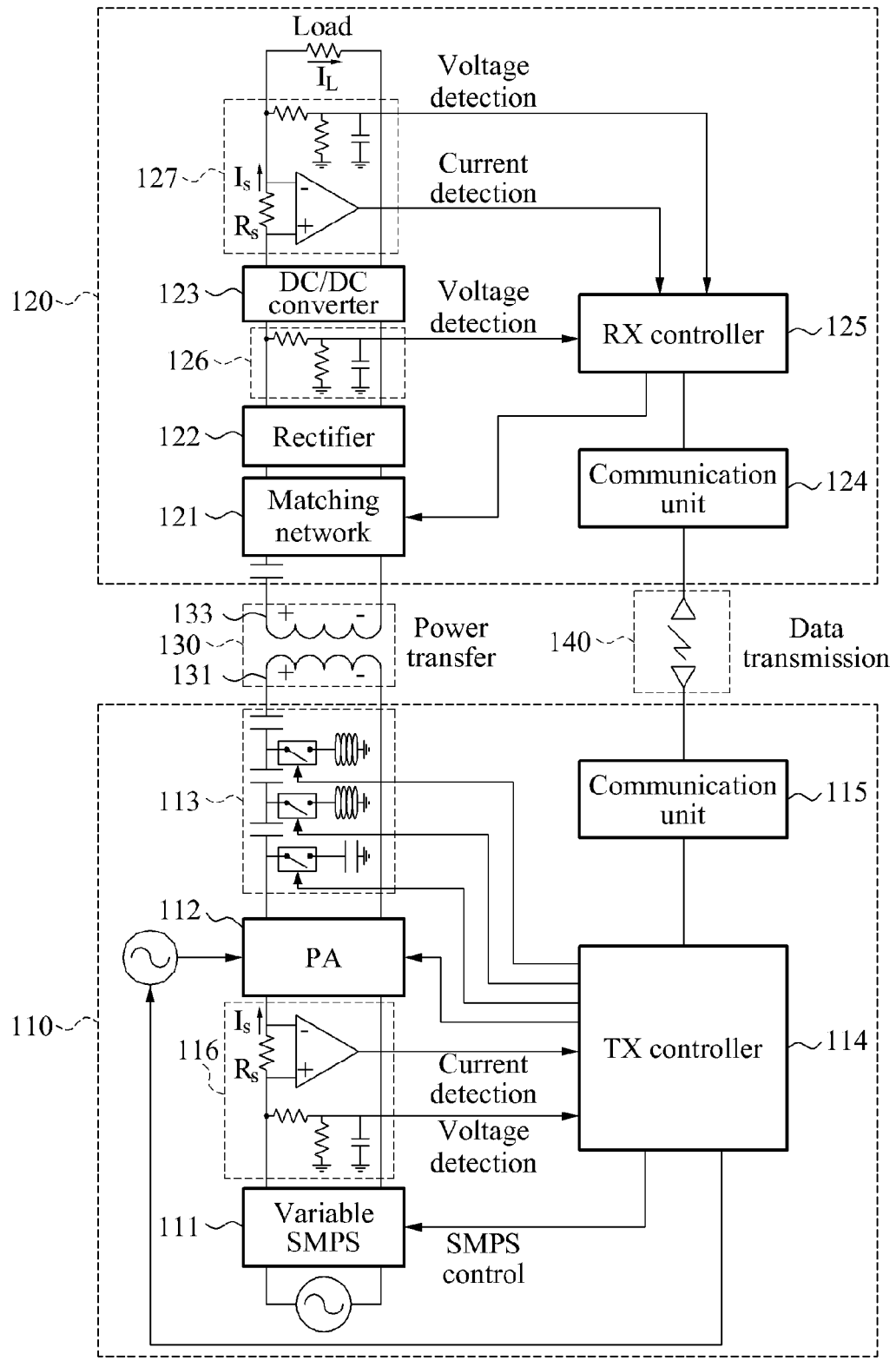
FIG. 1 illustrates an example of a wireless power transmission and reception system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a wireless power transmission and reception system.

Referring to FIG. 1, the wireless power transmission system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (TX) controller 114 (for example, transmission control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under the control of the transmission controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be necessary. In this example, the fixed SMPS outputs a fixed DC voltage to the variable DC/DC converter, and the variable DC/DC converter controls its output voltage supplied to the PA 112 based on the level of the power output from the PA 112 so that the PA 112 may operate in the saturation region with a high efficiency at all times, thereby enabling the maximum efficiency to be maintained at all levels of the output power of the PA 112.

The power detector 116 detects an output current and an output voltage of the variable SMPS 111, and transmits, to the transmission controller 114, information on the detected output current and the detected output voltage. Also, the power detector 116 may detect an input current and an input voltage of the PA 112.

The PA 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert a DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is to be transmitted using a resonant frequency in a band of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. The inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying power to a unit or element that is configured to charge a battery or other rechargeable device. Additionally, the term "charging" refers to supplying power to a unit or element is configured to consume power. For example, the term "charging power" may refer to power consumed by a target while operating, or power used to charge a battery of the target. The unit or element may be, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The transmission controller 114 may detect a reflected wave of the communication power or the charging power, and may detect mismatching that occurs between a target resonator 133 and the source resonator 131 based on the detected reflected wave. To detect the mismatching, for example, the transmission controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the transmission controller 114. The matching network 113 includes at least one inductor and at least one capacitor each connected to a respective switch controlled by the transmission controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The transmission controller 114 may calculate a voltage standing wave ratio (VSWR) based on a voltage level of the reflected wave and a level of an output voltage of the source resonator 131 or the PA 112. In one example, if the VSWR is greater than a predetermined value, the transmission controller 114 may determine that a mismatch is detected between the source resonator 131 and the target resonator 133.

In another example, if the VSWR is greater than the predetermined value, the transmission controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The transmission controller 114 may adjust a frequency of the switching pulse signal used by the PA 112. The frequency of the switching pulse signal may be determined under the control of the transmission controller 114. For example, by controlling the PA 112, the transmission controller 114 may generate a modulated signal to be transmitted to the target 120. In other words, the transmission controller 114 may transmit a variety of data to the target 120 using in-band communication. The transmission controller 114 may also detect a reflected wave, and may demodulate a signal received from the target 120 from an envelope of the detected reflected wave.

The transmission controller 114 may generate a modulated signal for in-band communication using various methods. For example, the transmission controller 114 may generate the modulated signal by turning the switching pulse signal used by the PA 112 on and off, by performing delta-sigma modulation, or by any other modulation method known to one of ordinary skill in the art. Additionally, the transmission controller 114 may generate a pulse-width modulated (PWM) signal having a predetermined envelope.

The transmission controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to sense a change in temperature of the source 110. The source 110 may receive from the target 120 information regarding the battery state of the target 120, the change in the amount of power received by the target 120, and/or the change in the temperature of the target 120 by communication with the target 120. The source 110 may detect the change in the temperature of the target 120 based on the information received from the target 120.

The transmission controller 114 may adjust a voltage supplied to the PA 112 using a lookup table (LUT). The lookup table may store a level of the voltage to be supplied to the PA 112 based on the change in the temperature of the source 110. For example, when the temperature of the source 110 rises, the transmission controller 114 may reduce the voltage to be supplied to the PA 112 by controlling the variable SMPS 111.

The communication unit 115 may perform out-of-band communication using a separate communication channel. The communication unit 115 may include a communication module, such as a ZigBee module, a Bluetooth module, or any other communication module known to one of ordinary skill in the art that the communication unit 115 may use to transmit and receive data 140 to and from the target 120 using the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a superconducting material. Also, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. In this instance, the target resonator 133 may also be disposed in a container of refrigerant to enable the target resonator 133 to maintain a superconducting state.

As illustrated in FIG. 1, the target 120 includes a matching network 121, a rectifier 122, a DC/DC converter 123, a communication unit 124, a reception (RX) controller 125 (for example, reception control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 using the in-band communication.

The target resonator 133 may receive the initial wireless power determined by the transmission controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. Additionally, the detected current and the detected voltage of the output terminal may be used by the reception controller 125 to calculate an amount of power actually transferred to the load. The transmission controller 114 of the source 110 may calculate an amount of power that needs to be transmitted by the source 110 to the target 120 based on an amount of power required by the load and the amount of power actually transferred to the load.

If the amount of the power actually transferred to the load calculated by the reception controller is transmitted to the source 110 by the communication unit 124, the source 110, the transmission controller 114 may calculate an amount of power that needs to be transmitted to the target 120, and may control either one or both of the variable SMPS 111 and the power amplifier 112 to generate an amount of power that will enable the calculated amount of power to be transmitted by the source 110.

The reception controller 125 may perform in-band communication to transmit and receive data to and from the source 110 using a resonant frequency. During the in-band communication, the reception controller 125 may demodulate a received signal by detecting a signal between the target resonator 133 and the rectifier 122, or detecting an output signal of the rectifier 122. In particular, the reception controller 125 may demodulate a message received using the in-band communication.

Additionally, the reception controller 125 may adjust an input impedance of the target resonator 133 using the matching network 121 to modulate a signal to be transmitted to the source 110. For example, the reception controller 125 may adjust the matching network 121 to increase the impedance of the target resonator 133 so that a reflected wave will be detected by the transmission controller 114 of the source 110. Depending on whether the reflected wave is detected, the transmission controller 114 of the source 110 may detect a first value, for example a binary number "0," or a second value, for example a binary number "1." For example, when the reflected wave is detected, the transmission controller 114 may detect "0", and when the reflected wave is not detected, the transmission controller 114 may detect "1". Alternatively, when the reflected wave is detected, the transmission controller 114 may detect "1", and when the reflected wave is not detected, the transmission controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communication unit 124 may perform out-of-band communication using a separate communication channel. For example, the communication unit 124 may include a communication module, such a ZigBee module, a Bluetooth module, or any other communication module that the communication unit 124 may use to transmit and receive the data 140 to and from the source 110 using the out-of-band communication.

The communication unit 124 may receive a wake-up request message from the source 110, and the power detector 127 may detect an amount of power received by the target resonator 133. The communication unit 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The source 110 and the target 120 of FIG. 1 may correspond to a wireless power transmission apparatus and a wireless power reception apparatus to be described hereinafter.

Figure 2:
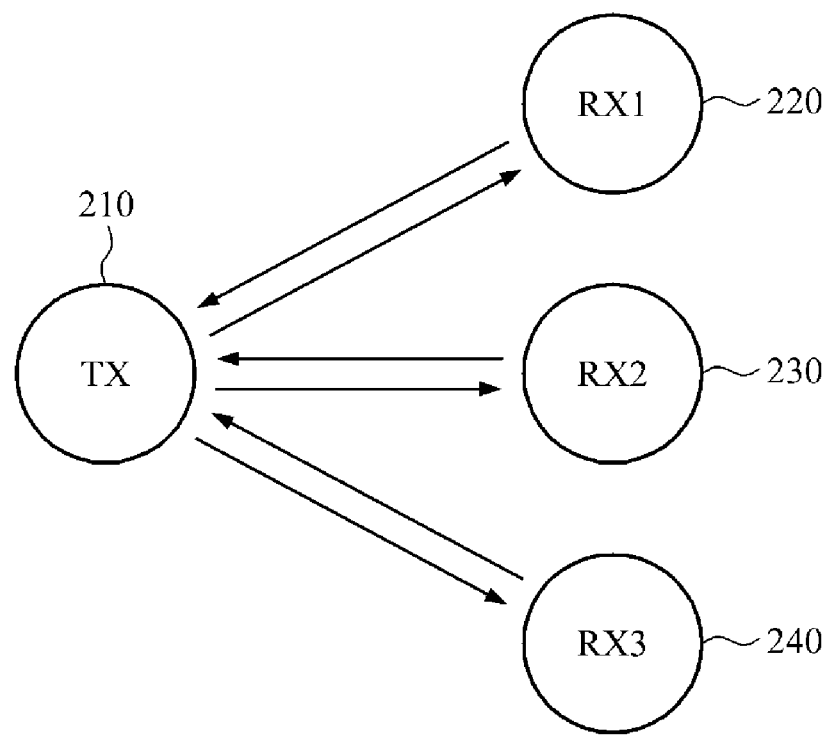
FIG. 2 illustrates an example of an environment in which a wireless power transmission apparatus is operated.

FIG. 2 illustrates an example of an environment in which a wireless power transmission apparatus (TX) 210 operates.

Referring to FIG. 2, the TX 210 may charge a plurality of wireless power reception apparatuses (RXs), for example, a first RX (RX1) 220, a second RX (RX2) 230, and a third RX (RX3) 240 located in a charging area of the TX 210. In the example of FIG. 2, the TX 210 and each of the RX1 220, the RX2 230, and the RX3 240 may recognize each other normally.

Each of the RX1 220, the RX2 230, and the RX3 240 advertise a signal including its own identifier to search for a TX to supply power. When the TX 210 receives advertisements of the RX1 220, the RX2 230, and the RX3 240, the TX 210 allocates channels to be used for communication and forms communication channels with the TX 210 and the RX1 220, the RX2 230, and the RX3 240, thereby forming networks between the TX 210 and the RX1 220, the RX2 230, and the RX3 240.

When the communication channels are formed between the TX 210 and the RX1 220, the RX2 230, and the RX3 240, the TX 210 recognizes that the RX1 220, the RX2 230, and the RX3 240 are located in the charging area of the TX 210.

The TX 210 requests information from the RX1 220, the RX2 230, and the RX3 240 using a polling scheme. In response to the request, each of the RX1 220, the RX2 230, and the RX3 240 transmits to the TX 210 information indicating a unique characteristic of a terminal, for example, a static parameter characteristic. For example, the information indicating the unique characteristic of the terminal may include information about a requested power of the terminal, for example, a power receiving unit (PRU) capability, or information about a charging support power. The requested power of the terminal is a power basically set for charging the terminal, and the charging support power is a power supported by the terminal for charging apart from the requested power. For example, an amount of the charging support power may be less than an amount of the requested power. Depending on a terminal, only a requested power may be provided to perform charging with the requested power, or a charging support power may also be provided in addition to a requested power to perform charging with the charging support power as well. In response to the request from the TX 210, each of the RX1 220, the RX2 230, and the RX3 240 transmits charging status information of the terminal. The charging status information may include information about a battery capacity and a current battery level, for example, information indicating whether a battery has been charged to 50% of its charging capacity or any other information about the battery capacity and the current battery level.

The TX 210 transmits to the RX1 220, the RX2 230, and the RX3 240 information indicating a unique characteristic of the TX 210, for example, a static parameter characteristic. For example, the information indicating the unique characteristic of the TX 210 may include a power capacity of the TX 210, for example, a power transmitting unit (PTU) capability. The power capacity is an amount of power the TX 210 can supply for simultaneous charging. For example, a power capacity of the TX 210 may be greater than or equal to 10 watts (W). A class of the TX 210 may be categorized based on the power capacity. For example, the TX 210 may be categorized into different classes of 10 W, 16 W, and 22 W. Classes of the RX1 220, the RX2 230, and the RX3 240 may be categorized based on a requested power. For example, the RX1 220, the RX2 230, and the RX3 240 may be categorized into different classes of 3.5 W and 6.5 W. However, these classes are merely examples, and there may be other classes in place of or in addition to these claims.

The TX 210 compares a sum of requested powers of the RX1 220, the RX2 230, and the RX3 240 to the power capacity of the TX 210 to determine whether the TX 210 is capable of charging the RX1 220, the RX2 230, and the RX3 240. In addition, when information about charging support powers is provided by the RX1 220, the RX2 230, and the RX3 240, the TX 210 compares a sum of the requested powers and the charging support powers of the RX1 220, the RX2 230, and the RX3 240 to the power capacity of the TX 210 to determine whether the TX 210 is capable of charging the RX1 220, the RX2 230, and the RX3 240.

When the TX 210 determines that it is capable of charging the RX1 220, the RX2 230, and the RX3 240, the TX 210 transmits information about a charging capacity with respect to each of the RX1 220, the RX2 230, and the RX3 240. For example, when the TX 210 determines that it is capable of charging the RX1 220 with the requested power of the RX1 220, the TX 210 determines the charging capacity with respect to the RX1 220 to be the requested power of the RX1 220, and the TX 210 transmits information indicating that the RX1 220 will be charged with the requested power of the RX1. When the TX 210 determines that it is not capable of charging the RX2 230 with the requested power of the RX2 230, but determines that it is capable of charging the RX2 230 with the charging support power of the RX2 230, the TX 210 determines the charging capacity with respect to the RX2 230 to be the charging support power of the RX2 230, and the TX 210 transmits information indicating that the RX2 230 will be charged with the charging support power of the RX2 230.

When the TX 210 determines that is not capable of charging the RX1 220, the RX2 230, and the RX3 240, the TX 210 may display a capacity exceeded message as one example. The capacity exceeded message indicates that the power capacity of the TX 210 is insufficient to charge the RX1 220, the RX2 230, and the RX3 240 simultaneously. As another example, the TX 210 may display a removal request message requesting a user to remove one of the RX1 220, the RX2 230, and the RX3 240 from the charging area. For example, the TX 210 may display a removal request message identifying a wireless power reception apparatus requesting a greatest amount of power among the RX1 220, the RX2 230, and the RX3 240.

When TX 210 displays the capacity exceeded message or the removal request message, a user of the RX1 220, the RX2 230, and the RX3 240 may remove one of the RX1 220, the RX2 230, and the RX3 240 from the charging area of the TX 210 to initiate charging of the remaining ones of the RX1 220, the RX2 230, and the RX3 240. If the TX 210 displays the removal request message, the user may remove the one of the RX1 220, the RX2 230, and the RX3 240 identified in the removal message from the charging area of the TX 210, or may remove a different one of the RX1 220, the RX2 230, and the RX3 240.

When one of the RX1 220, the RX2 230, and the RX3 240 is removed from the charging area, the TX 210 recalculates the charging capacities. The TX 210 initiates charging based on the re-calculated charging capacities. The TX 210 determines whether it is capable of charging the RX1 220, the RX2 230, and the RX3 240 based on information received from the RX1 220, the RX2 230, and the RX3 240. When the TX 210 determines that it is capable of charging the RX1 220, the RX2 230, and the RX3 240, the TX 210 transmits information about a charging capacity to each of the RX1 220, the RX2 230, and the RX3 240. When the TX 210 determines that it is not capable of charging the RX1 220, the RX2 230, and the RX3 240, the TX 210 displays a message indicating that a wireless power reception apparatus is to be removed from the charging area to perform charging. Accordingly, the TX 210 may perform charging efficiently within the power capacity, and the RX1 220, the RX2 230, and the RX3 240 may transmit feedback to be used for charging quickly to the TX 210. Hereinafter, other examples will be described.

The TX 210 may receive charging status information from the RX1 220, the RX2 230, and the RX3 240, and calculate a residual amount needed to complete charging for each of the RX1 220, the RX2 230, and the RX3 240. The TX 210 may readjust charging capacities in order from a greatest residual amount needed to complete charging to a smallest residual amount needed to complete charging among the RX1 220, the RX2 230, and the RX3 240.

For example, the RX1 220 may support a requested power of 5 W and a charging support power of 4 W, and be charged with the charging support power of 4 W. The RX2 230 may support a requested power of 5 W and a charging support power of 4 W, and be charged with the charging support power of 4 W. The RX3 240 may support a requested power of 2 W, and be charged with the requested power of 2 W. The TX 210 may be aware through charging status information of the RX1 220 that 80% of a battery capacity of 6 W is charged, and that a residual amount of 1.2 W is needed to complete charging. The TX 210 may be aware through charging status information of the RX2 230 that 50% of a battery capacity of 6 W is charged, and that a residual amount of 3 W is needed to complete charging. In addition, the TX 210 may be aware through charging status information of the RX3 240 that 90% of a battery capacity of 3 W is charged, and that a residual amount of 0.3 W is needed to complete charging.

In this example, since the residual amount of the RX2 230 needed to complete charging is the greatest at 3 W, the TX 210 may adjust the charging capacity of the RX2 230 from the charging support power of 4 W to the requested power of 5 W.

As another example, the TX 210 may receive charging status information from the RX1 220, the RX2 230, and the RX3 240, and calculate a residual amount needed to switch to a constant voltage (CV) mode for each of the RX1 220, the RX2 230, and the RX3 240. The TX 210 may readjust charging capacities in order from a greatest residual amount needed to switch to the CV mode to a smallest residual amount needed to switch to the CV mode among the RX1 220, the RX2 230, and the RX3 240.

Figure 3:
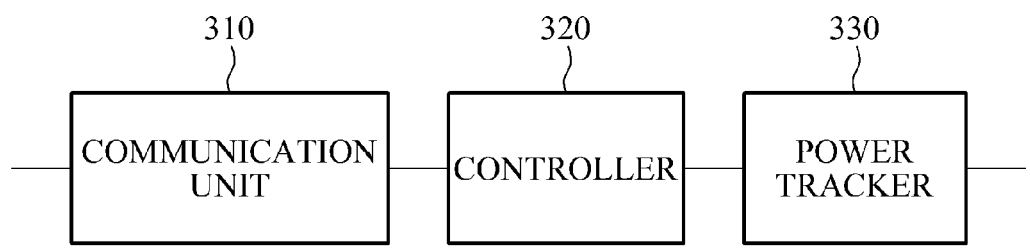
FIG. 3 illustrates an example of a wireless power transmission apparatus.

FIG. 3 illustrates an example of a wireless power transmission apparatus.

Referring to FIG. 3, the wireless power transmission apparatus includes a communication unit 310, a controller 320, and a power tracker 330.

The communication unit 310 receives information about either one or both of a charging support power and a requested power from each of a plurality of wireless power reception apparatuses. The requested power is an amount of power set for charging for each wireless power reception apparatus. The charging support power is an amount of power to be used for additional charging, apart from the requested power. For example, depending on a type of a wireless power reception apparatus, a requested power may be supported, or both a requested power and a charging support power may be supported. A single wireless power reception apparatus may support a plurality of charging support powers.

In addition, the communication unit 310 receives information about a battery capacity and a current battery level from each of the wireless power reception apparatuses.

For example, the communication unit 310 may receive the information from the plurality of wireless power reception apparatuses using a Bluetooth low energy (BLE) scheme.

The controller 320 verifies whether a sum of requested powers of the plurality of wireless power reception apparatuses is within a range of a power capacity of the wireless power transmission apparatus. When the sum of the requested powers exceeds the range of the power capacity, the controller 320 determines a charging capacity for a wireless power reception apparatus supporting a charging support power. For example, the controller 320 may determine charging capacities for some of the wireless power reception apparatuses to be charging support so that the charging capacities with respect to all of the wireless power reception apparatuses are within the range of the power capacity.

As an example, the controller 320 may primarily determine a charging capacity to be a charging support power for a wireless power reception apparatus for which a difference between a requested power and a charging support power is relatively great. For example, when there are a wireless power reception apparatus for which a requested power is 5 W and a charging support power is 4 W, and a wireless power reception apparatus for which a requested power is 5 W and a charging support power is 3 W, the controller 320 may determine a charging capacity for the wireless power reception apparatus for which the charging support power is 3 W to be the charging support power of 3 W.

As another example, the controller 320 may adjust a charging capacity of each wireless power reception apparatus based on charging status information and capacity information of a battery received from each of the plurality of wireless power reception apparatuses. The controller 320 may calculate a residual amount of power needed to switch to a CV mode or complete charging for each wireless power reception apparatus based on the received charging status information and the received capacity information. The controller 320 may increase a charging capacity with respect to a wireless power reception apparatus having a relatively great residual amount of power needed to switch to a CV mode or complete charging, and decrease a charging capacity with respect to a wireless power reception apparatus having a relatively small residual amount of power needed to switch to a CV mode or complete charging. The charging capacity may be increased or decreased when a wireless power reception apparatus supports both a requested power and a charging support power. A single wireless power reception apparatus may support a plurality of charging support powers.

The controller 320 may determine a charging capacity for a wireless power reception apparatus supporting the charging support power based on information about the charging support power.

The communication unit 310 transmits information about the charging capacity determined by the controller 320 to the wireless power reception apparatus. As an example, when the controller 320 determines a charging capacity to be a charging support power, the communication unit 310 reports to a corresponding wireless power reception apparatus that the charging capacity is the charging support power. As another example, when the controller 320 changes a charging capacity from a requested power to a charging support power, or from a charging support power to a requested power, the communication unit 310 transmits information about the changed charging capacity to a corresponding wireless power reception apparatus.

The communication unit 310 may receive charging status information from a wireless power reception apparatus being charged with the charging capacity determined by the controller 320. For example, the charging status information may include complete charging information indicating that the wireless power reception apparatus is completely charged, and CV mode switching information indicating that a charging mode of the wireless power reception apparatus has been switched from a constant current (CC) mode to a CV mode. The wireless power reception apparatus may periodically report the charging status information to the wireless power transmission apparatus.

The power tracker 330 may re-track the determined charging capacity based on charging status information received from each of the plurality of wireless power reception apparatuses. The power tracker 330 may terminate charging of a completely charged wireless power reception apparatus or a wireless power reception apparatus for which a charging mode has been switched to a CV mode, and initiate charging of another wireless power reception apparatus or readjust a charging capacity of another wireless power reception apparatus.

When information indicating that a charging mode has been switched to a CV mode is received from one of the plurality of wireless power reception apparatuses, the power tracker 330 may readjust a charging capacity of another wireless power reception apparatus to be a requested power of the other wireless power reception apparatus if enough charging capacity has been freed up by the one wireless power transmission apparatus that has been switched to the CV mode.

The power tracker 330 may calculate a residual amount of power needed to switch to a CV mode or complete charging for each wireless power reception apparatus based on the charging status information received from each of the plurality of wireless power reception apparatuses. The power tracker 330 may increase a charging capacity of a wireless power reception apparatus having a relatively great residual amount of power needed to switch to a CV mode or complete charging, and decrease a charging capacity of a wireless power reception apparatus having a relatively small residual amount of power needed to switch to a CV mode or complete charging. The power tracker 330 may increase or decrease a charging capacity when a wireless power reception apparatus supports both a requested power and a charging support power. A single wireless power reception apparatus may support a plurality of charging support powers.

Figure 4:
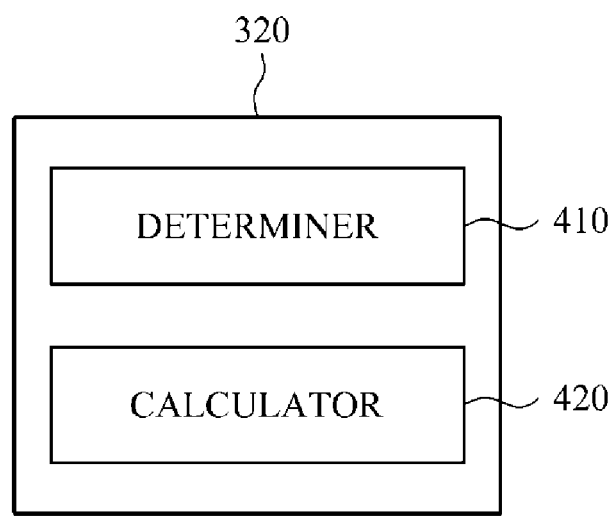
FIG. 4 illustrates an example of a controller of FIG. 3.

FIG. 4 illustrates an example of the controller 320 of FIG. 3.

Referring to FIG. 4, the controller 320 includes a determiner 410 and a calculator 420.

The determiner 410 determines whether a plurality of wireless power reception apparatuses are capable of being charged within a range of a power capacity of a wireless power transmission apparatus based on information about requested powers received from the plurality of wireless power reception apparatuses.

In addition, the determiner 410 determines whether the plurality of wireless power reception apparatuses are capable of being charged within the range of the power capacity of the wireless power transmission apparatus based on information about requested powers and charging support powers received from the plurality of wireless power reception apparatuses.

Further, the determiner 410 determines whether the plurality of wireless power reception apparatuses are capable of being charged within the range of the power capacity of the wireless power transmission apparatus based on information about charging support powers received from the plurality of wireless power reception apparatuses.

The calculator 420 calculates a charging capacity based on a charging support mode provided by a wireless power reception apparatus supporting a charging support power. The meaning of a charging support mode may be preset between a wireless power reception apparatus and a wireless power transmission apparatus. For example, a charging support mode of "00" may indicate that a charging capacity has been calculated to be a requested power. A charging support mode of "01" may indicate that a charging capacity has been calculated to be 66% of a requested power. A charging support mode of "10" may indicate that a charging capacity has been calculated to be 33% of a requested power. A charging support mode of "11" may indicate that a charging capacity has been calculated to be 2.5 W.

Figure 5:
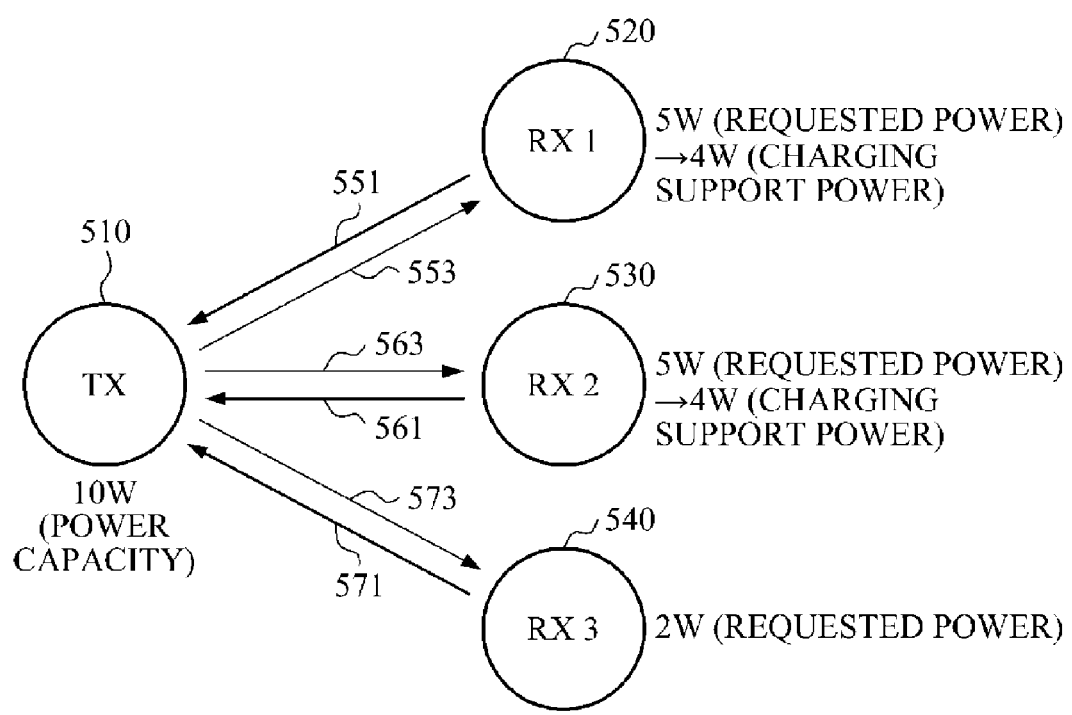
FIGS. 5 and 6 illustrate examples of an operation of a wireless power transmission apparatus for a case in which a power capacity of the wireless power transmission apparatus covers charging capacities of a plurality of wireless power reception apparatuses.
Figure 6:
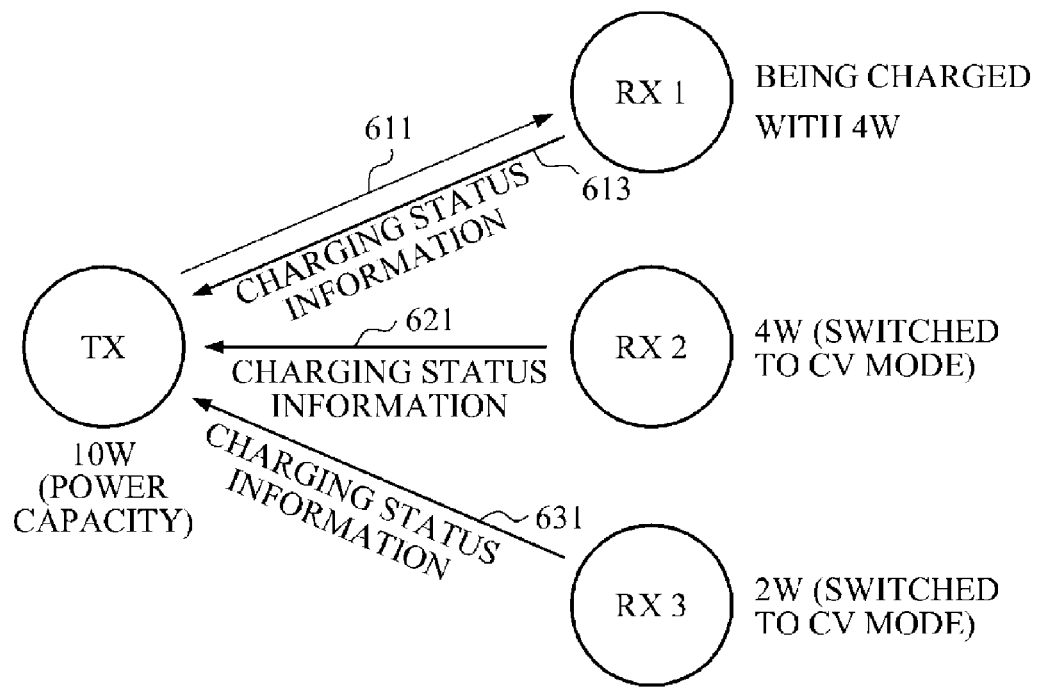

FIGS. 5 and 6 illustrate examples of an operation of a TX for a case in which a power capacity of the TX covers charging capacities of a plurality of RXs, for example, an RX1, an RX2, and an RX3.

Referring to FIG. 5, a power capacity of a TX 510 is set to 10 W. An RX1 520, an RX2 530, and an RX3 540 are normally connected to the TX 510.

When communication channels are formed between the TX 510 and the RX1 520, the RX2 530, and the RX3 540, the TX 510 requests information from the RX1 520, the RX2 530, and the RX3 540 using a polling scheme. The RX1 520 transmits to the TX 510 information 551 about a requested power of 5 W and a charging support power of 4 W of the RX1 520. The RX2 530 transmits to the TX 520 information 561 about a requested power of 5 W and a charging support power of 4 W of the RX2 530. The RX3 540 transmits to the TX 510 information 571 about a requested power of 2 W of the RX3 540. The RX3 540 provides only the requested power and not a charging support power.

A sum of the requested powers received from the RX1 520, the RX2 530, and the RX3 540 is 12 W, which exceeds the power capacity of 10 W of the TX 510. A sum of the charging support powers of the RX1 520 and the RX2 530 and the requested power of the RX3 540 is 10 W, which is within a range of the power capacity of 10 W of the TX 510. Accordingly, the TX 510 determines the charging capacities to be the charging support powers with respect to the RX1 520 and the RX2 530 and the requested power with respect to the RX3 540.

The TX 510 transmits to the RX1 520 information 553 about a charging capacity determined with respect to the RX1 520 to be the charging support power of 4 W of the RX1 520. The TX 510 transmits to the RX2 530 information 563 about a charging capacity determined with respect to the RX2 530 to be the charging support power of 4 W of the RX2 530. The TX 510 transmits to the RX3 540 information 573 about a charging capacity determined with respect to the RX3 540 to be the requested power of 2 W of the RX3 540.

The TX 510 then charges the RX1 520, the RX2 530, and the RX3 540.

Referring to FIG. 6, an RX1, an RX2, and an RX3 periodically report charging status information 613, 621, and 631 to a TX. When the charging status information 621 and 631 indicating that charging modes of the RX2 and the RX3 have been switched to a CV mode is reported to the TX, the TX terminates charging of the RX2 and the RX3, adjusts a charging capacity of the RX1 being charged with 4 W to be a requested power of 5 W, and transmits information 611 about the adjusted charging capacity of 5 W to the RX1. The TX then charges the RX1 with 5 W.

Figure 7:
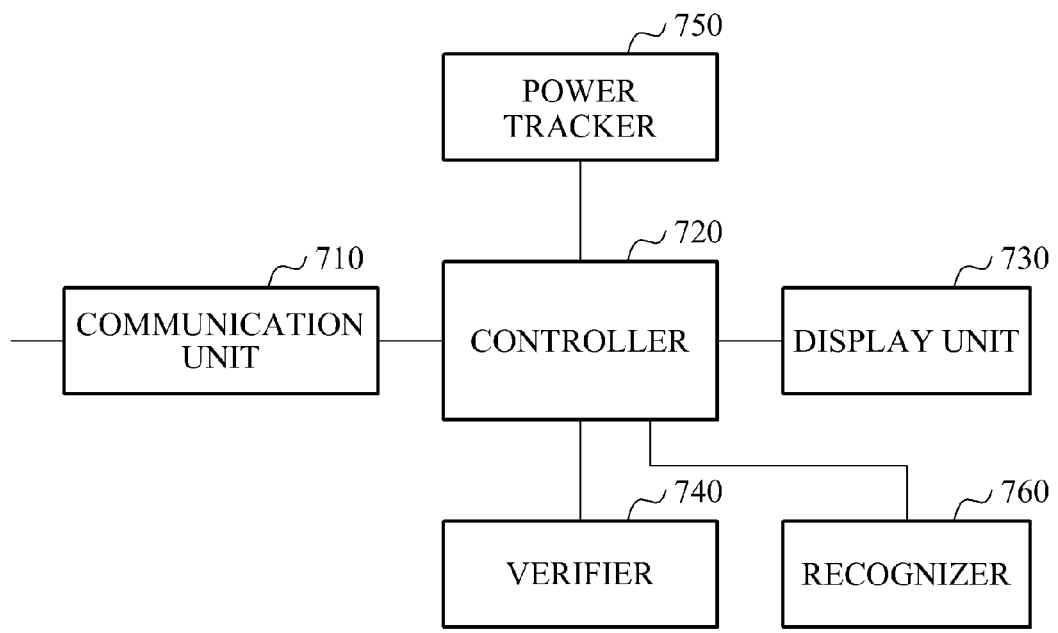
FIG. 7 illustrates another example of a wireless power transmission apparatus.

FIG. 7 illustrates another example of a wireless power transmission apparatus.

Referring to FIG. 7, the wireless power transmission apparatus includes a communication unit 710, a controller 720, a display unit 730, a verifier 740, a power tracker 750, and a recognizer 760.

The communication unit 710 receives information about either one or both of a charging support power and a requested power from each of a plurality of wireless power reception apparatuses. For example, depending on a type of a wireless power reception apparatus, a requested power may be supported, or both a requested power and a charging support power may be supported. A single wireless power reception apparatus may support a plurality of charging support powers.

The controller 720 verifies whether charging capacities of the plurality of wireless power reception apparatuses are within a range of a power capacity of the wireless power transmission apparatus based on the information about either one or both of the charging support power and the requested power. The controller 720 may generate a capacity exceeded message when the charging capacities of the plurality of wireless power reception apparatuses exceed the range of the power capacity of the wireless power transmission apparatus.

The controller 720 may also generate a removal request message requesting a user to remove one of the plurality of wireless power reception apparatuses from a charging area. For example, the controller 720 may generate a removal request message identifying a wireless power reception apparatus requesting a greatest amount of power, among the plurality of wireless power reception apparatuses.

When the charging capacities of the plurality of wireless power reception apparatuses exceed the range of the power capacity of the wireless power transmission apparatus, the display unit 730 displays the capacity exceeded message. The display unit 730 may be provided in a predetermined area of the wireless power transmission apparatus as a screen to display the capacity exceeded message using letters, an image, a video, or any other method of displaying the capacity exceeded message. As another example, the display unit 730 may announce the capacity exceeded message using sound.

The display unit 730 may also display the removal request message.

The verifier 740 verifies whether a wireless power reception apparatus located out of the charging area of the wireless power transmission apparatus is present among the plurality of wireless power reception apparatuses after the capacity exceeded message is displayed. For example, the verifier 740 may identify, through the communication unit 710, a disconnected wireless power reception apparatus in a communication channel, thereby verifying whether a wireless power reception apparatus located out of the charging area is present.

The communication unit 710 re-receives the information about either one or both of the charging support power and the requested power after the capacity exceeded message is displayed. The controller 720 determines a charging capacity for a wireless power reception apparatus supporting the charging support power based on the re-received information about either one or both of the charging support power and the requested power.

The communication unit 710 transmits information about the charging capacity determined by the controller 720 to the wireless power reception apparatus. As an example, when a charging capacity is determined to be a charging support power, the communication unit 710 reports to a corresponding wireless power reception apparatus that the charging capacity is determined to be the charging support power. As another example, when a charging capacity is changed from a requested power to a charging support power, or from a charging support power to a requested power, the communication unit 710 transmits information about the changed charging capacity to a corresponding wireless power reception apparatus.

The communication unit 710 receives charging status information from a wireless power reception apparatus being charged with the charging capacity determined by the controller 720. For example, the charging status information may include complete charging information indicating that the wireless power reception apparatus is completely charged, and CV mode switching information indicating that a charging mode of the wireless power reception apparatus has been switched from a CC mode to a CV mode. The wireless power reception apparatus may periodically report the charging status information to the wireless power transmission apparatus.

The power tracker 750 re-tracks the determined charging capacity based on the charging status information received from each of the plurality of wireless power reception apparatuses. The power tracker 750 may terminate charging with respect to a completely charged wireless power reception apparatus or a wireless power reception apparatus of which a charging mode has been switched to a CV mode, and initiate charging of another wireless power reception apparatus or readjust a charging capacity of another wireless power reception apparatus.

When information indicating that a charging mode has been switched to a CV mode is received from one of the plurality of wireless power reception apparatuses, the power tracker 750 may readjust a charging capacity for another wireless power reception apparatus to be a requested power of the other wireless power reception apparatus.

The controller 720 may determine a combination minimizing a residual amount of the power capacity of the wireless power transmission apparatus to be a combination of wireless power reception apparatuses to be charged based on the power capacity of the wireless power transmission apparatus and an amount of power requested by the plurality of wireless power reception apparatuses. For example, in determining targets to be charged, the controller 720 may determine the targets to be charged to be a combination of wireless power reception apparatuses capable of being charged simultaneously using a greatest amount of power within the range of the power capacity of the wireless power transmission apparatus when the plurality of wireless power reception apparatuses are located in the charging area of the wireless power transmission apparatus.

The controller 720 may determine a combination of a maximum number of wireless power reception apparatuses capable of being charged within the range of the power capacity of the wireless power transmission apparatus to be a combination of wireless power reception apparatuses to be charged.

The recognizer 760 recognizes an external power supply. For example, the wireless power transmission apparatus may include a universal serial bus (USB) port. When an external power supply is connected through the USB port, the recognizer 760 may recognize power supplied by the external power supply. For example, the power input through the USB port may be 3.5 W.

The controller 720 may determine a charging capacity for a wireless power reception apparatus supporting the charging support power based on a power capacity of the external power supply recognized by the recognizer 760 and the information about either one or both of the charging support power and the requested power received by the communication unit 710. For example, the controller 720 may determine the charging capacity based on the power capacity of 3.5 W.

The controller 720 may determine a charging capacity for a wireless power reception apparatus supporting the charging support power based on a power capacity of the external power supply recognized by the recognizer 760, and the information about either one or both of the charging support power and the requested power received by the communication unit 710. For example, the controller 720 may determine the charging capacity based on the power capacity of 3.5 W.

Figure 8:
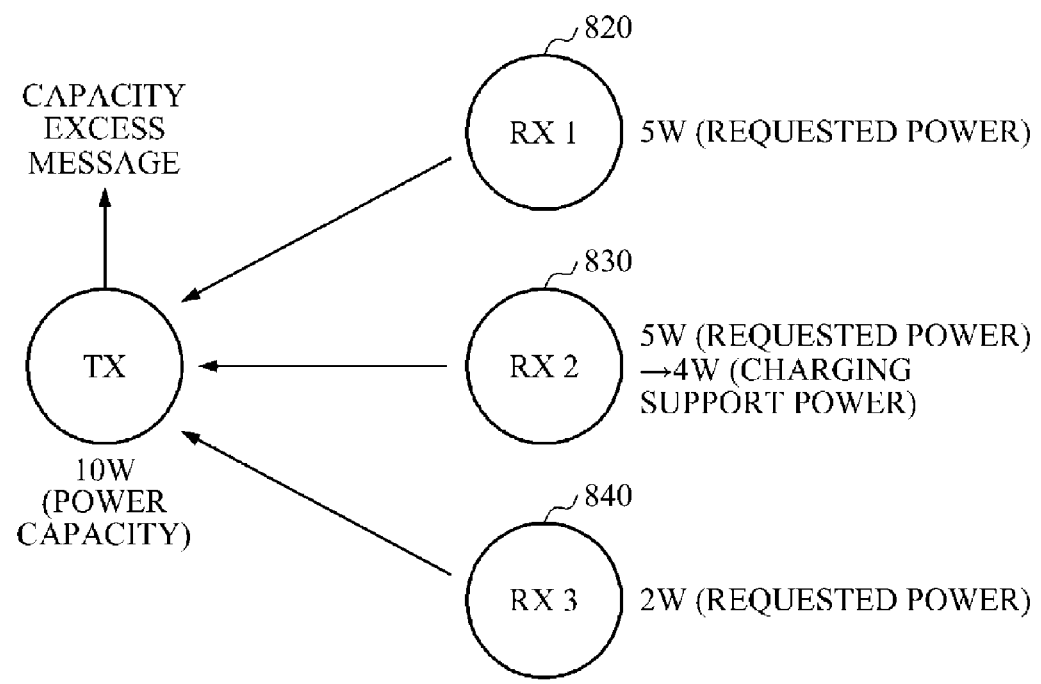
FIGS. 8 through 10 illustrate examples of an operation of a wireless power transmission apparatus for a case in which a power capacity of the wireless power transmission apparatus does not cover charging capacities of a plurality of wireless power reception apparatuses.
Figure 9:
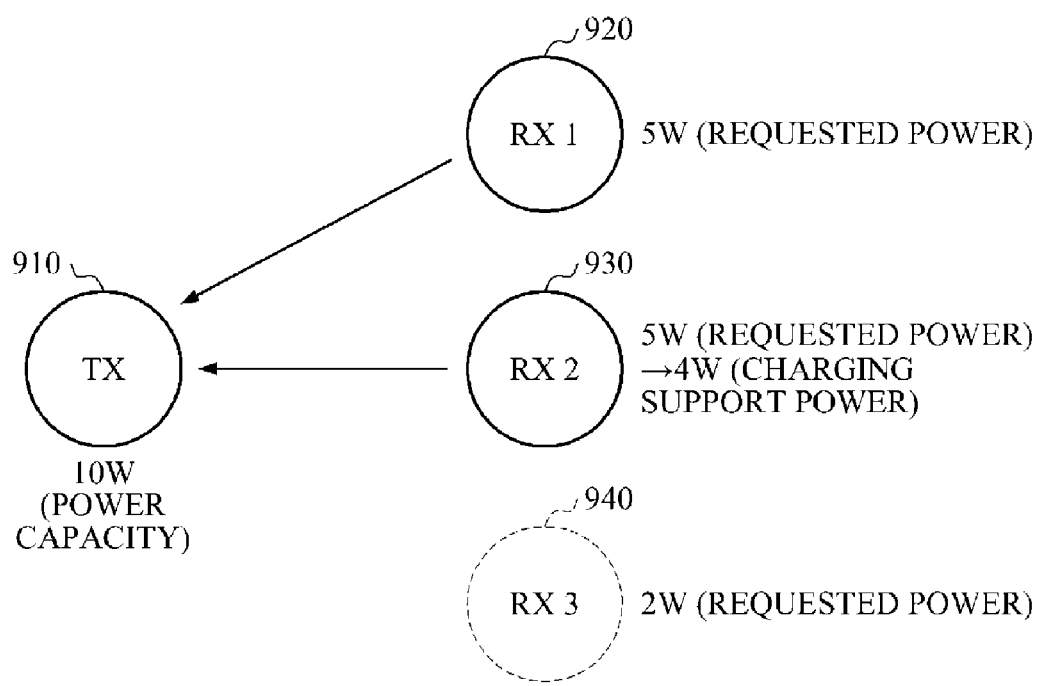
Figure 10:
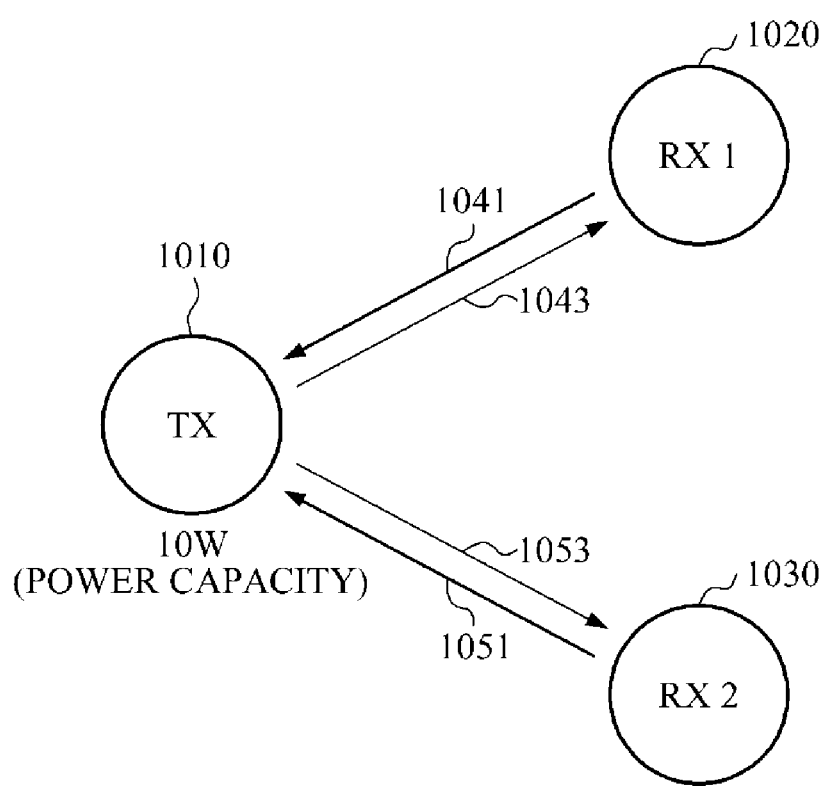

FIGS. 8 through 10 illustrate examples of an operation of a TX in a case in which a power capacity of the TX does not cover charging capacities of a plurality of RXs, for example, an RX1, an RX2, and an RX3.

Referring to FIG. 8, a power capacity of a TX 810 is set to 10 W. An RX1 820, an RX2 830, and an RX3 840 are normally connected to the TX 810.

When communication channels are formed between the TX 810 and the RX1 820, the RX2 830, and the RX3 840, the TX 810 requests information from the RX1 820, the RX2 830, and the RX3 840 using a polling scheme. The RX1 820 transmits to the TX 810 information about a requested power of 5 W of the RX1 820. The RX2 830 transmits to the TX 810 information about a requested power of 5 W and a charging support power of 4 W of the RX2 830. The RX3 840 transmits to the TX 810 information about a requested power of 2 W of the RX3 840. The RX1 820 and the RX3 840 provide only the requested powers and not charging support powers.

A sum of the requested powers received from the RX1 820, the RX2 830, and the RX3 840 is 12 W, which exceeds the power capacity of 10 W of the TX 810. In addition, a sum of the requested powers of the RX1 820 and the RX3 840 and the charging support power of the RX2 830 is 11 W, which exceeds the power capacity of 10 W of the TX 810. Accordingly, the TX 810 does not have the capability of charging the RX1 820, the RX2 830, and the RX3 840 simultaneously.

In this instance, the TX 810 may display a capacity exceeded message indicating that the RX1 820, the RX2 830, and the RX3 840 may not be charged because the power capacity of 10 W of the TX 810 has been exceeded.

Referring to FIG. 9, a displayed capacity exceeded message is confirmed by a user, and an RX3 940 is removed from the charging are of a TX 910 by the user. The TX 910 identifies a disconnected wireless power reception apparatus on communication networks formed between the TX 910 and an RX1 920, an RX2 930, and the RX3 940, thereby confirming that the RX3 940 has been removed from the charging area of the TX 910.

Referring to FIG. 10, a TX 1010 calculates charging capacities with respect to an RX1 1020 and an RX2 1030 based on information 1041 about a requested power of 5 W of the RX1 1020 and information 1051 about a requested power of 5 W of the RX2 1030. Since a sum of the requested power of 5 W of the RX1 1020 and the requested power of 5 W of the RX2 1030 is within a range of a power capacity of 10 W of the TX 1010, the TX 1010 determines the charging capacity for the RX1 1020 to be the requested power of 5 W of the RX1 1020, and determines the charging capacity for the RX2 1030 to be the requested power of 5 W of the RX2 1030. The TX 1010 transmits information 1043 and 1053 about the determined charging capacities to the RX1 1020 and the RX2 1030.

FIGS. 11 through 14 illustrate examples of a TX determining a terminal to be charged.

Figure 11:
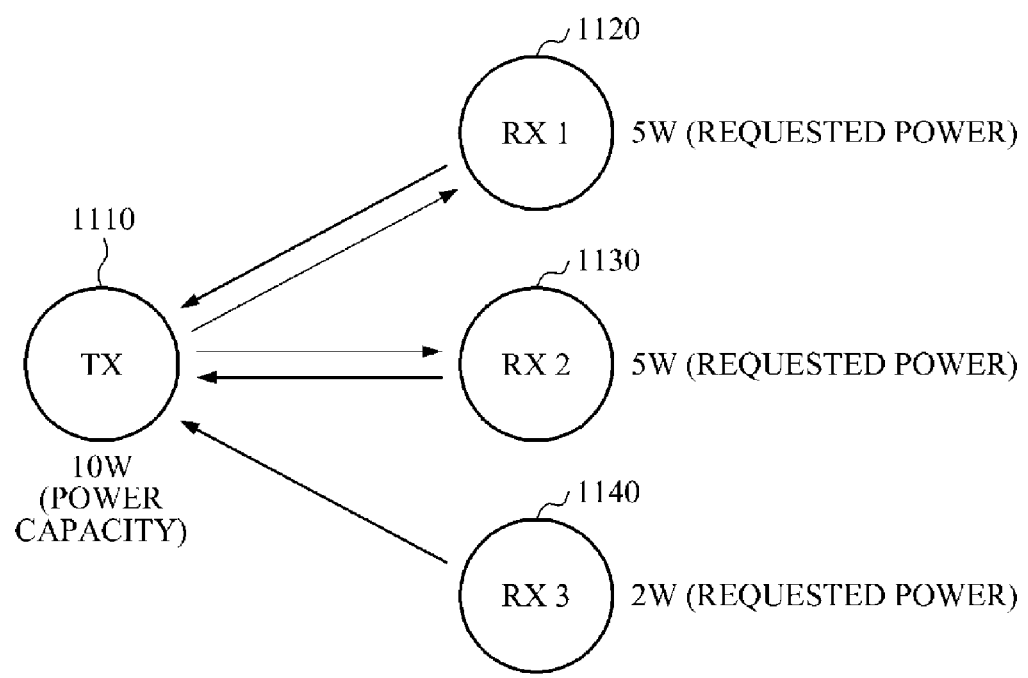
FIGS. 11 through 14 illustrate examples of a wireless power transmission apparatus determining a terminal to be charged.

Referring to FIG. 11, a TX 1110 may determine a terminal to be charged based on information about requested powers received from an RX1 1120, an RX2 1130, and an RX3 1140.

For example, the TX 1110 may determine a combination of terminals minimizing a residual capacity as a result of calculating requested powers of the RX1 1120, the RX2 1130, and the RX3 1140 based on a power capacity of 10 W of the TX 1110 to be terminals to be charged.

The requested power of the RX1 1120 is 5 W, the requested power of the RX2 1130 is 5 W, and the requested power of the RX3 1140 is 2 W. A combination of the RX1 1120 and the RX2 1130 is combination minimizing the residual capacity, since the residual capacity is 0 W when a sum of the requested powers of 5 W+5 W of the RX1 1120 and the RX2 1130 is subtracted from the power capacity of 10 W. Accordingly, the RX1 1120 and the RX2 1130 are determined to be terminals to be charged.

Figure 12:
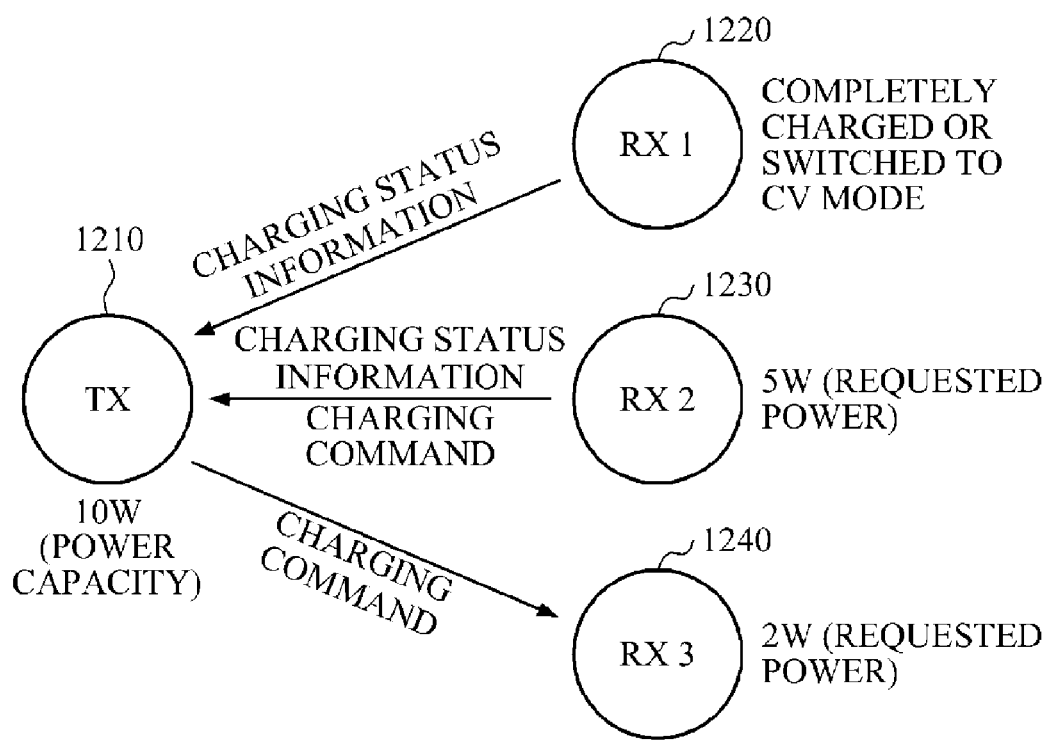

Referring to FIG. 12, when charging status information indicating that an RX1 1220 is completely charged or a charging mode of the RX1 1220 has been switched to a CV mode is transmitted from the RX1 1220 to a TX 1210 while the RX1 1220 and an RX2 1230 are being charged by the TX 1210, the TX 1210 transmits a charging command to an RX3 1240 to initiate charging. Charging status information may be transmitted from the RX2 1230 to the TX 1210 periodically until complete charging information or CV mode switching information is received from the RX2 1230.

Figure 13:
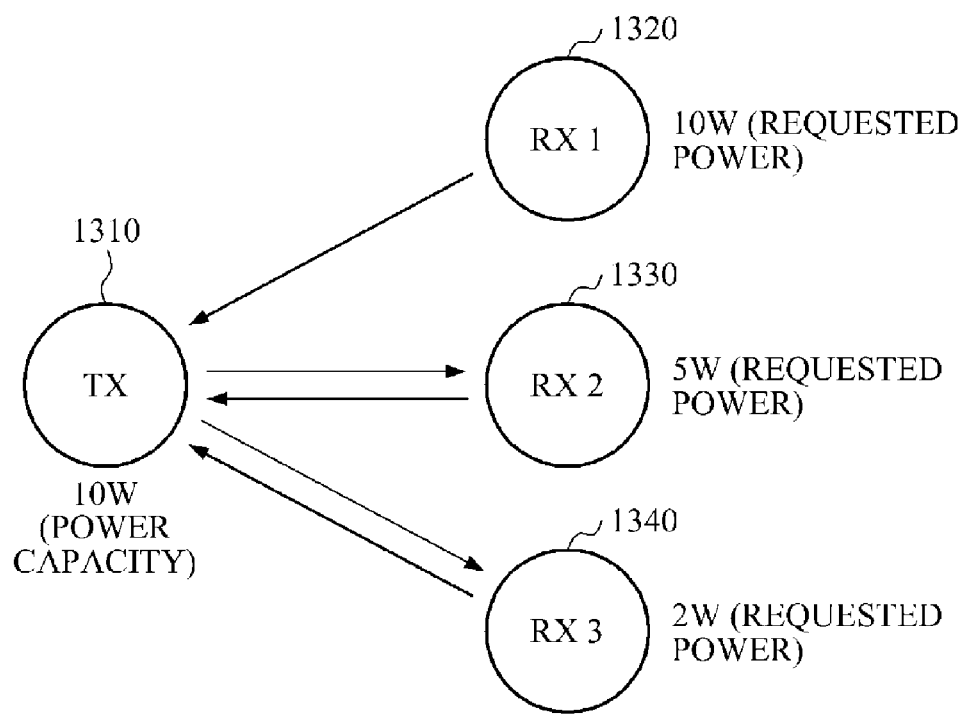

Referring to FIG. 13, a TX 1310 determines terminals to be charged based on information about requested powers received from an RX1 1320, an RX2 1330, and an RX3 1340.

For example, the TX 1310 may determine terminals constituting a combination of a maximum number of terminals capable of being charged as a result of calculating requested powers of the RX1 1320, the RX2 1330, and the RX3 1340 based on a power capacity of 10 W of the TX 1310 to be terminals to be charged.

The requested power of the RX1 1320 is 10 W, the requested power of the RX2 1330 is 5 W, and the requested power of the RX3 1340 is 2 W. A combination of the RX2 1330 and the RX3 1340, excluding the RX1 1320, is the combination of the maximum number of terminals capable of being charged since two terminals are capable of being charged. Accordingly, the RX2 1330 and the RX3 1340 are determined to be terminals to be charged.

Figure 14:
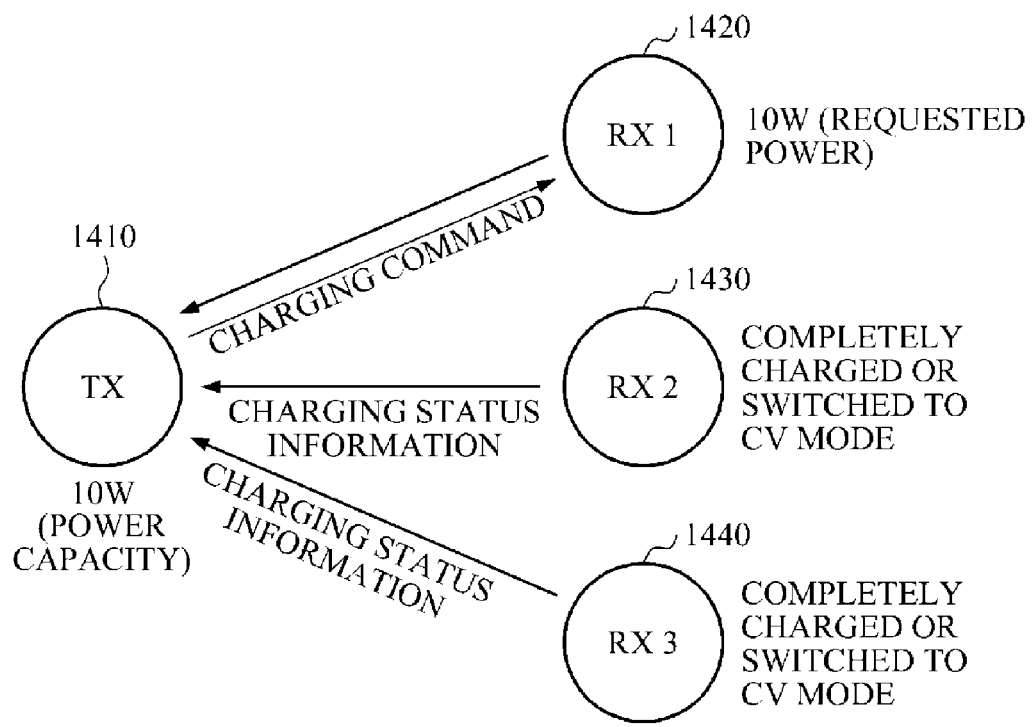

Referring to FIG. 14, when charging status information indicating that an RX2 1430 and an RX3 1440 are completely charged or that charging modes of the RX2 1430 and the RX3 1440 have been switched to a CV mode is transmitted to from the RX2 1430 and the RX3 1440 to a TX 1410 while the RX2 1430 and the RX3 1440 are being charged by the TX 1410, the TX 1410 terminates charging of the RX2 1430 and the RX3 1440, and transmits a charging command to an RX1 1420 to initiate charging.

Figure 15:
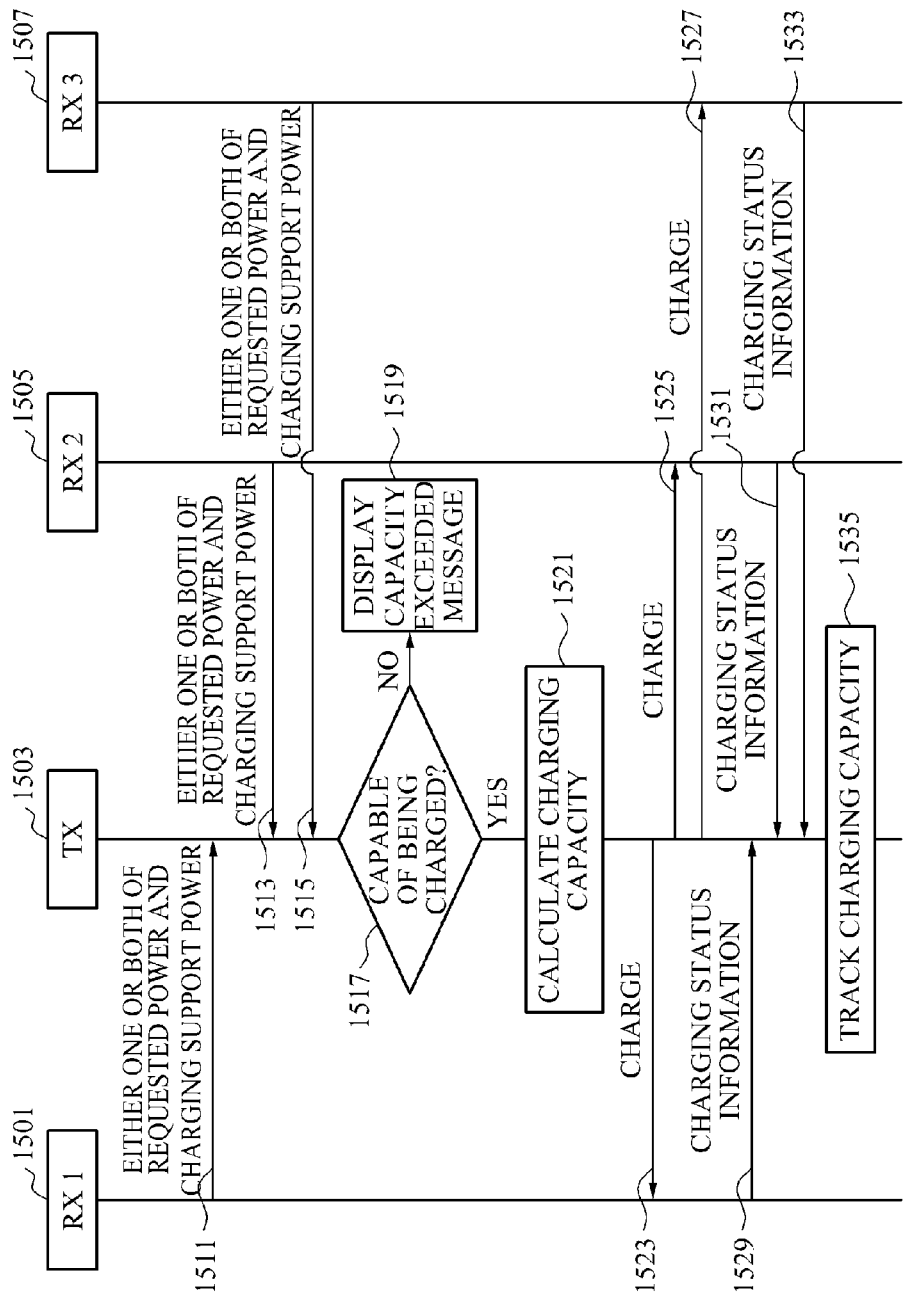
FIG. 15 illustrates an example of a wireless power transmission method.

FIG. 15 illustrates an example of a wireless power transmission method.

Referring to FIG. 15, in 1511, a TX 1503 receives information about either one or both of a requested power and a charging support power from an RX1 1501. When the RX1 1501 supports both the requested power and the charging support power, information about both the requested power and the charging support power may be transmitted. When the RX1 1501 supports the requested power, information about the requested power may be transmitted. In 1513, the TX 1503 receives information about either one or both of a requested power and a charging support power from an RX2 1505. In 1515, the TX 1503 receives information about either one or both of a requested power and a charging support power from an RX3 1507. When each of the RX2 1505 and the RX3 1507 supports both the requested power and the charging support power, information about both the requested power and the charging support power may be transmitted. When each of the RX2 1505 and the RX3 1507 supports the requested power, information about the requested power may be transmitted.

In 1517, the TX 1503 determines whether the RX1 1501, the RX2 1505, and the RX3 1507 are capable of being charged based on the received information about the requested powers. When a sum of the requested powers of the RX1 1501, the RX2 1505, and the RX3 1507 is within a range of a power capacity of the TX 1503, the TX 1503 determines that the RX1 1501, the RX2 1505, and the RX3 1507 are capable of being charged. In addition, the TX 1503 may determine whether the RX1 1501, the RX2 1505, and the RX3 1507 are capable of being charged based on the charging support powers of the RX1 1501, the RX2 1505, and the RX3 1507.

In 1519, the TX 1503 displays a capacity exceeded message when it is determined that the RX1 1501, the RX2 1505, and the RX3 1507 are not capable of being charged simultaneously.

In 1521, the TX 1503 calculates charging capacities for the RX1 1501, the RX2 1505, and the RX3 1507 when it is determined that the RX1 1501, the RX2 1505, and the RX3 1507 are capable of being charged simultaneously. The charging capacities of the RX1 1501, the RX2 1505, and the RX3 1507 may be determined to be the requested powers or the charging support powers within the range of the power capacity of the TX 1503.

In 1523, the TX 1503 transmits information about the calculated charging capacity to the RX1 1501, and initiates charging of the RX1 1501. In 1525, the TX 1503 transmits information about the calculated charging capacity to the RX2 1505, and initiates charging of the RX2 1505. In 1527, the TX 1503 transmits information about the calculated charging capacity to the RX3 1507, and initiates charging of the RX3 1507.

In 1529, the RX1 1501 transmits charging status information to the TX 1503. The charging status information may include information about a current charging level compared to a complete charging state, information about a complete charging state, information regarding whether a charging mode is switched to a CV mode, and any other charging status information.

In 1531, the RX2 1505 transmits charging status information to the TX 1503. In 1533, the RX3 1507 transmits charging status information to the TX 1503.

In 1535, the TX 1503 tracks the charging capacities based on the charging status information received from the RX1 1501, the RX2 1505, and the RX3 1507. When one of the RX1 1501, the RX2 1505, and the RX3 1507 is completely charged or a charging mode of one of the RX1 1501, the RX2 1505, and the RX3 1507 has been switched to a CV mode, the TX 1503 terminates charging of the corresponding terminal and increases charging capacities for the remaining terminals.

As described above, a wireless power transmission apparatus may determine whether a plurality of wireless power reception apparatuses are capable of being charged based on information received from the plurality of wireless power reception apparatuses, transmit information about a charging capacity to each of the plurality of wireless power reception apparatuses when it is determined that the plurality of wireless power reception apparatuses are capable of being charged, and display a message indicating that at least one of the plurality of wireless power reception apparatuses is to be removed from a charging area of the wireless power transmission apparatus so that charging can be performed when it is determined that the plurality of wireless power reception apparatuses are not capable of being charged. Accordingly, the wireless power transmission apparatus may perform charging efficiently within a power capacity of the wireless power transmission apparatus, and the plurality of wireless power reception apparatuses may transmit feedback needed for control of the charging to the wireless power transmission apparatus.

The transmission controller 114, the communication units 115 and 124, and the reception controller 125 in FIG. 1, the communication unit 310, the controller 320, and the power tracker 330 in FIG. 3, the controller 320, the determiner 410, and the calculator 420 in FIG. 4, and the communication unit 710, the controller 720, the display unit 730, the verifier 740, the power tracker 750, and the recognizer 760 in FIG. 7 that perform the various operations described with respect to FIGS. 2, 5, 6, and 8-15 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus for tracking a charging capacity of each of a plurality of wireless power reception apparatuses in an environment in which the plurality of wireless power reception apparatuses are charged, the wireless power transmission apparatus comprising:
   a communication unit configured to receive information about either one or both of a charging support power and a requested power from each of the plurality of wireless power reception apparatuses;
   a controller configured to determine, based on a comparison between information about a power capacity of the wireless power transmission apparatus and the received information about the charging support power from each of the plurality of wireless power reception apparatuses, a charging capacity for a first wireless power reception apparatus among the plurality of wireless power reception apparatuses; and
   a power tracker configured to re-track, based on charging status information received from the plurality of wireless power reception apparatuses, the determined charging capacity.

2. The wireless power transmission apparatus of claim 1, wherein:
   the communication unit is further configured to receive the information about the requested power from each of the plurality of wireless power reception apparatuses; and
   the controller comprises a determiner configured to determine, based on the received information about the requested power received from each of the plurality of wireless power reception apparatuses, whether the plurality of wireless power reception apparatuses are capable of being charged within a range of the power capacity of the wireless power transmission apparatus.

3. The wireless power transmission apparatus of claim 2, wherein the controller is further configured to determine, based on the received information about the charging support power from the first wireless power reception apparatus and in response to a total amount of power requested by the plurality of wireless power reception apparatuses exceeding the range of the power capacity of the wireless power transmission apparatus, the charging capacity for the first wireless power reception apparatus.

4. The wireless power transmission apparatus of claim 1, wherein the controller comprises a calculator configured to calculate, based on a charging support mode provided by the first wireless power reception apparatus, the charging capacity for the first wireless power reception apparatus.

5. The wireless power transmission apparatus of claim 1, wherein:
   the communication unit is further configured to receive constant voltage (CV) mode switching information indicating that a charging mode of the first wireless power reception apparatuses has been switched to a CV mode; and
   the power tracker is further configured to readjust, in response to the communication unit receiving the CV mode switching information from the first wireless power reception apparatus, a charging capacity for a second wireless power reception apparatus among the plurality of wireless power reception apparatuses to be a requested power of the second wireless power reception apparatus.

6. The wireless power transmission apparatus of claim 1, wherein at least one of the plurality of wireless power reception apparatuses is configured to support the requested power and not support the charging support power.

7. The wireless power transmission apparatus of claim 1, wherein the communication unit is further configured to receive the charging status information from the first wireless power reception apparatus to be charged with the determined charging capacity.

8. The wireless power transmission apparatus of claim 1, wherein the communication unit is further configured to transmit information about the determined charging capacity to the first wireless power reception apparatus.

9. A wireless power transmission apparatus for determining whether each of a plurality of wireless power reception apparatuses is to be charged and tracking a charging capacity in an environment in which the plurality of wireless power reception apparatuses are charged, the wireless power transmission apparatus comprising:
   a communication unit configured to receive information about either one or both of a charging support power and a requested power from each of the plurality of wireless power reception apparatuses;
   a controller configured to determine whether charging capacities of the plurality of wireless power reception apparatuses are within a range of a power capacity of the wireless power transmission apparatus based on the information about the either one or both of the charging support power and the requested power; and
   a display unit configured to display a capacity exceeded message in response to the controller determining that the charging capacities exceed the range of the power capacity.

10. The wireless power transmission apparatus of claim 9, further comprising a verifier configured to verify, after the capacity exceeded message has been displayed, whether the plurality of wireless power transmission apparatuses comprises a wireless power reception apparatus located out of a charging area of the wireless power transmission apparatus.

11. The wireless power transmission apparatus of claim 9, wherein:
   the communication unit is further configured to re-receive, after the capacity exceeded message has been displayed, information about the either one or both of the charging support power and the requested power; and
   the controller is further configured to determine, based on the re-received information about the either one or both of the charging support power and the requested power, a charging capacity for a first wireless power reception apparatus among the plurality of wireless power reception apparatuses.

12. The wireless power transmission apparatus of claim 11, further comprising a power tracker configured to re-track, based on charging status information received from the plurality of wireless power reception apparatuses, the determined charging capacity.

13. The wireless power transmission apparatus of claim 9, wherein:
   the communication unit is further configured to receive the information about the requested power from each of the plurality of wireless power reception apparatuses; and
   the controller is further configured to determine, based on the power capacity of the wireless power transmission apparatus and the information about the requested power received from the plurality of wireless power reception apparatuses, a combination of wireless power reception apparatuses among the plurality of power reception apparatuses to be charged to be a combination of wireless power transmission apparatuses minimizing a residual amount of the power capacity of the wireless power transmission apparatus.

14. The wireless power transmission apparatus of claim 9, wherein the controller is further configured to determine a combination of wireless power reception apparatuses among the plurality of power reception apparatuses to be charged to be a combination of a maximum number of wireless power reception apparatuses capable of being charged within the range of the power capacity of the wireless power transmission apparatus.

15. The wireless power transmission apparatus of claim 9, further comprising a recognizer configured to recognize an external power; supply,
   wherein the controller is further configured to determine, based on a power capacity of the external power supply and the information about the either one or both of the charging support power and the requested power received from the plurality of wireless power reception apparatuses, a charging capacity for a first wireless power reception apparatus among the plurality of wireless power reception apparatuses.

16. A wireless power transmission method of a wireless power transmission apparatus for tracking a charging capacity of each of a plurality of wireless power reception apparatuses in an environment in which the plurality of wireless power reception apparatuses are charged, the method comprising:
   receiving information about either one or both of a charging support power and a requested power from each of the plurality of wireless power reception apparatuses;
   determining, based on a comparison between information about a power capacity of the wireless power transmission apparatus and the information about the charging support power received from a first wireless power reception apparatus among the plurality of wireless power reception apparatuses, a charging capacity for the first wireless power reception apparatus; and re-tracking, based on charging status information received from the plurality of wireless power reception apparatuses, the determined charging capacity.

17. The method of claim 16, wherein:
the receiving comprises receiving the information about the requested power from each of the plurality of wireless power reception apparatuses; and
the determining comprises determining, based on the information about the requested power received from each of the plurality of wireless power reception apparatuses, whether the plurality of wireless power reception apparatuses are capable of being charged within a range of the power capacity of the wireless power transmission apparatus.

18. The method of claim 17, wherein the determining comprises determining, based on the information about the charging support power received from the first wireless power reception apparatus and in response to a total amount of power requested by the plurality of wireless power reception apparatuses exceeding the range of the power capacity of the wireless power transmission apparatus, the charging capacity for the wireless power reception apparatus supporting the charging support power.

19. The method of claim 16, wherein the determining comprises calculating, based on a charging support mode provided by the first wireless power reception apparatus, the charging capacity for the first wireless power reception apparatus.

20. The method of claim 16, further comprising receiving the charging status information from the first wireless power reception apparatus to be charged with the determined charging capacity.

21. A wireless power transmission apparatus for tracking a charging capacity of each of a plurality of wireless power reception apparatuses in an environment in which the plurality of wireless power reception apparatuses are charged, the wireless power transmission apparatus comprising:
a communication unit configured to receive:
information about a charging support power and a requested power from each of ones of the plurality of wireless power reception apparatuses supporting the charging support power;
information about a requested power from each of other ones of the plurality of wireless power reception apparatuses not supporting the charging support power; and
charging status information from each of the plurality of wireless power reception apparatuses;
a controller configured to allocate, based on the information about the charging support power and the requested power, respective charging capacities to the plurality of wireless power reception apparatuses so that a sum of the allocated charging capacities does not exceed a range of a power capacity of the wireless power transmission apparatus; and
a power tracker configured to reallocate, based on the charging status information, the respective charging capacities.

22. The wireless power transmission apparatus of claim 21, wherein the controller is further configured to:
determine whether a sum of the requested powers of the plurality of wireless power reception apparatuses exceeds the range of the power capacity of the wireless power transmission apparatus;
allocate the respective charging capacities based on the information about the requested power received from each of the plurality of wireless power reception apparatuses in response to a result of the determining being that the sum of the requested powers of the plurality of wireless power reception apparatuses does not exceed the range of the power capacity of the wireless power transmission apparatus; and
allocate the respective charging capacities based on the information about the charging support power received from each of the ones of the plurality of wireless power reception apparatuses supporting the charging support power and the requested power received from each of the other ones of the plurality of wireless power reception apparatuses not supporting the charging support power in response to a result of the determining being that the sum of the requested powers of the plurality of wireless power reception apparatuses exceeds the range of the power capacity of the wireless power transmission apparatus.

23. The wireless power transmission apparatus of claim 21, wherein:
the communication unit is further configured to receive constant voltage (CV) mode switching information indicating that a charging mode has been switched to a CV mode from ones of the plurality of wireless power reception apparatuses in which a charging mode has been switched to the CV mode; and
the power tracker is further configured to reallocate, based on the charging status information and the CV mode switching information, the respective charging capacities.

24. The wireless power transmission apparatus of claim 21, wherein the controller is further configured to:
determine, based on the information about the charging support power and the requested power, whether the wireless power transmission apparatus is capable of charging all of the wireless power reception apparatuses simultaneously;
generate, in response to a result of the determining being that the wireless power transmission apparatus is not capable of charging all of the wireless power reception apparatuses simultaneously, a removal request message requesting that one of the wireless power reception apparatuses be removed from a charging area of the wireless power transmission apparatus; and
allocate, after one of the wireless power reception apparatuses has been removed from the charging area of the wireless power transmission apparatus, respective charging capacities to remaining ones of the plurality of wireless power reception apparatuses.

25. The wireless power transmission apparatus of claim 21, wherein the controller is further configured to:
determine, based on the information about the charging support power and the requested power, whether the wireless power transmission apparatus is capable of charging all of the wireless power reception apparatuses simultaneously; and
allocate, in response to a result of the determining being that the wireless power transmission apparatus is not capable of charging all of the wireless power reception apparatuses simultaneously, respective charging capacities to only ones of the plurality of wireless power reception apparatuses that the wireless power transmission apparatus is capable of charging simultaneously.

* * * * *